United States Patent [19]
Duncan

[11] 4,032,054
[45] June 28, 1977

[54] GOLF ARTICLE CARRIER

[76] Inventor: Norman E. Duncan, 713 Wesley Drive, Park Ridge, Ill. 60068

[22] Filed: Aug. 14, 1975

[21] Appl. No.: 604,594

[52] U.S. Cl. .................... 224/29 B; 224/42.46 R; 280/DIG. 6
[51] Int. Cl.² ...................................... B60R 11/00
[58] Field of Search ............... 224/29 R, 29 B, 35, 224/32 R, 42.42 R, 42.42 A, 42.45 R, 42.46 R, 42.45 B; 108/25, 32, 38, 39, 44; 150/1.5 R, 1.5 B, 1.5 C; D12/23; 280/DIG. 6; 211/14, 48, 86; 206/244, 284, 460, 461, 483; 220/1 V, 1 H, 18, 69, 70; 211/60 M, 87, 88; 312/101; 248/311, 231

[56] References Cited
UNITED STATES PATENTS

| | | |
|---|---|---|
| 2,633,278 | 3/1953 | Muniz ..................... 224/42.46 R |
| 2,754,070 | 7/1956 | Krueger ..................... 248/311.1 |
| 2,944,593 | 7/1960 | Zarnke ........................... 248/96 |
| 3,010,628 | 11/1961 | Kowalczyk ..................... 224/29 B |
| 3,062,422 | 11/1962 | Lord ............................... 224/29 B |
| 3,233,563 | 2/1966 | Mauchline ..................... 108/44 |

Primary Examiner—Albert J. Makay
Assistant Examiner—Lawrence E. Williams

[57] ABSTRACT

An article carrier adapted to be detachably secured to a golf bag and including a rear wall which slopes upwardly and rearwardly from the bottom wall, so that when the carrier is secured to a golf bag disposed in an inclined position, the carrier bottom wall will be disposed in a substantially horizontal position.

7 Claims, 5 Drawing Figures

GOLF ARTICLE CARRIER

SUMMARY OF THE INVENTION

The invention relates to article carriers of the type used by golfers to carry miscellaneous items such as drinks, extra balls and tees, cigarettes and scorecards.

It is a primary object of the invention to provide a tray type receptacle which may be detachably secured to and carried by a golf bag which is in turn carried on a golf cart.

Another object of the invention is the provision of an article carrier of the type described which, when mounted on a golf bag which is disposed in an inclined position, which is the normal position for a golf bag which is carried on a golf cart, the tray will be maintained in a substantially horizontal or level position.

A more specific object of the invention is to provide, in a carrier of the type described, a sloping rear wall which is inclined at approximately the same angle as that of a golf bag carried on a cart, so that the bottom wall of the carrier will remain in a horizontal or level position.

Another specific object of the invention is to provide a simple, yet reliable means of releasably securing the carrier to a golf bag.

These and other objects of the invention will be apparent from an examination of the following description and drawing.

THE DRAWING

It will be understood that, for purposes of clarity, certain elements may have been intentionally omitted from certain views where they are believed to be illustrated to better advantage in other views.

Figure 1:
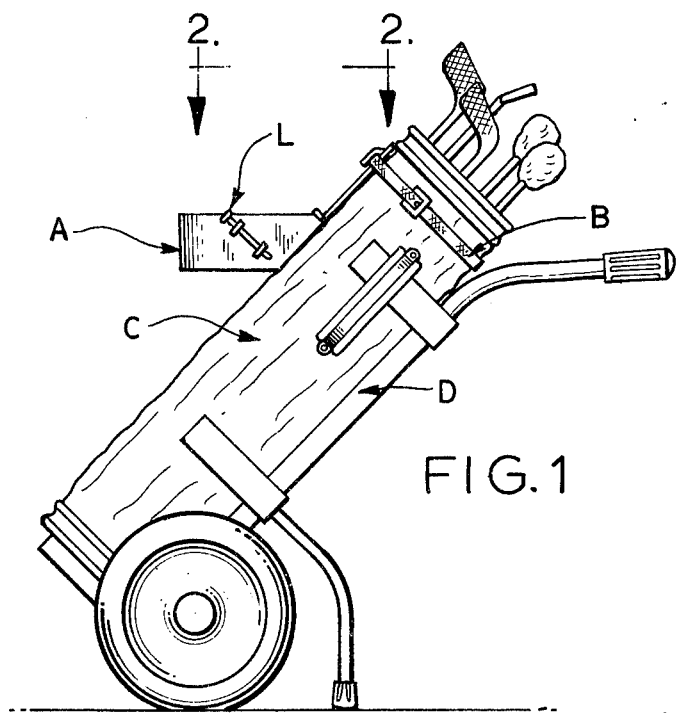
FIG. 1 is a fragmentary side elevation of a carrier embodying features of the invention and shown attached to a golf bag carried on a golf cart.
Figure 4:
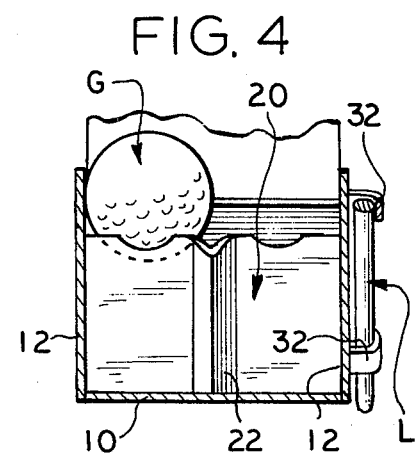
FIG. 4 is a fragmentary, transverse, vertical section taken on line 4—4 of FIG. 2.
Figure 5:
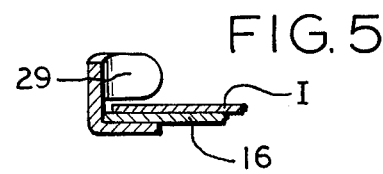
FIG. 5 is a fragmentary, transverse section taken on line 5—5 of FIG. 3.

Referring now to the drawing for a better understanding of the invention, it will be seen in FIG. 1 that an article carrier embodying features of the invention, and indicated generally at A, is shown attached to a strap B of a golf bag C which is carried on a golf cart D.

Figure 2:
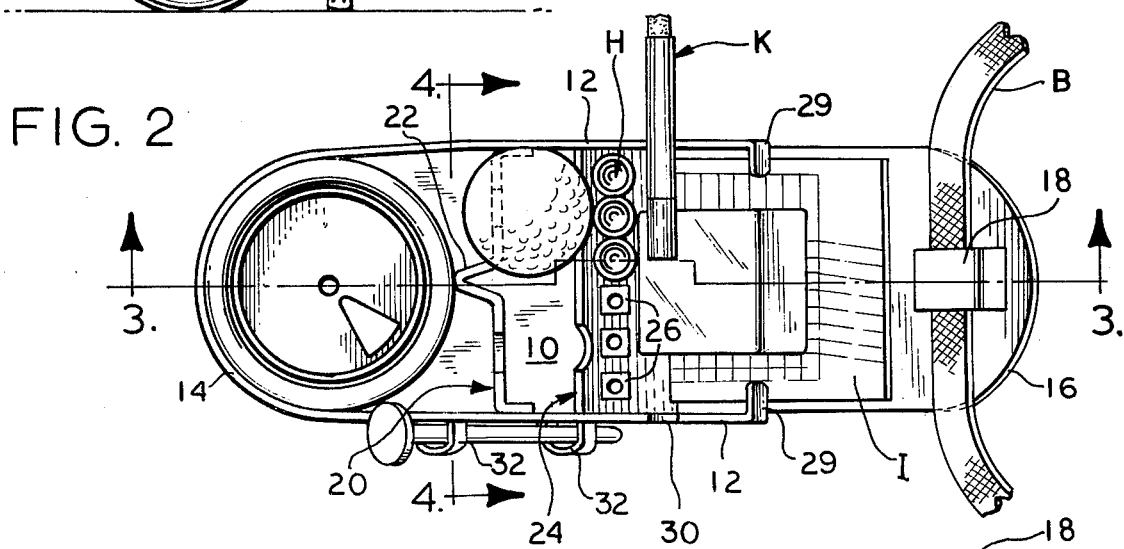
FIG. 2 is a plan view of the carrier illustrated in FIG. 1.

As best seen in FIG. 2, it will be seen the article carrier A is in the form of an open top tray-type receptacle designed and constructed to hold a variety of articles used by golfers, such as: a beverage can insulator E and beverage can F, golf balls G, tees H, a score card I, an individual cigarette K, and a ball marker L.

Figure 3:
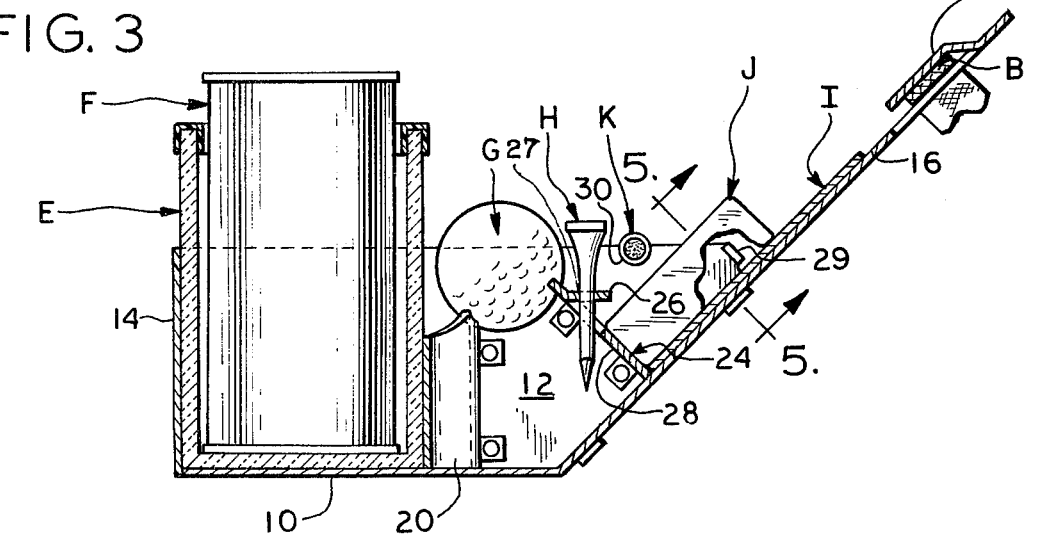
FIG. 3 is a longitudinal, vertical section taken on line 3—3 of FIG. 2.

Referring to FIGS. 2 and 3, it will be seen that carrier A includes a bottom wall 10, a pair of opposed parallel side walls 12, and a pair of front and rear end walls 14 and 16, respectively, which are interconnected to form a tray-like receptacle open at the top.

The carrier may be molded as an integral or unitary article or may be formed from a plurality of pieces of sheet material welded or riveted together, or it may be formed by a combination of these manufacturing methods.

Still referring to FIGS. 2 and 3, it will be seen that front end wall 14 is preferably curved to fit the cylindrical contour of an insulator E for a beverage can F.

Rear end wall 16 slopes upwardly and rearwardly from the rear edge of the bottom wall 10 at an angle of between 90° and 180°, so that when the carrier is attached to a golf bag C which is in a normally inclined position on a golf cart D, bottom wall 10 will be disposed in a substantially level or horizontal position.

The upper portion of rear end wall 16 extends a substantial distance above the upper edges of the front end wall 14 and the side walls 12, and it is provided with an integral clip 18 adapted to engage a golf bag strap B for the purpose of detachably securing carrier A to golf bag C.

Intermediate front and rear end walls 14 and 16 there is provided a first transverse wall 20 which extends in a generally vertical plane between side walls 12. First transverse wall 20 may be provided with a central V-shaped projection or center post 22 which provides additional rigidity and also which serves to space the main portion of the wall from beverage can insulator E. It will be noted that front end wall 14 and center post 22 are arranged to receive the insulator E snugly therebetween.

Rearwardly of first transverse wall 20 there is provided a second transverse wall 24 which also extends between side walls 12 in parallel relation with first transverse wall 20 and which is spaced rearwardly therefrom the proper distance to support therewith one or more golf balls C.

As best seen in FIG. 3, second transverse wall 24 has an upper portion, which extends in a horizontal plane and which is provided with a plurality of transversely spaced holes 27 for holding a plurality of tees H, and a lower portion 28 which extends upwardly from rear end wall 16 approximately normal thereto, to cooperate therewith for retaining thereon a scorecard I and a small article such as a package of cigarettes J.

In order to help retain a scorecard I against the upper surface of rear end wall 16, there may be provided a pair of opposed lugs 29 which extend inwardly from the rear extremeties of side walls 12.

If desired, one of the holes 27 may be formed slightly larger than the other holes to receive a scoring pencil (not shown) rather than another tee.

The upper edges of the side walls 12 may be provided with accurate notches or recesses 30 adapted to receive one or more cigarettes K.

Also, at least one, if not both, of the side walls 12 may be provided with a pair of vertically spaced loops 32 which are inclined at an angle of approximately 45°. The purpose of the loops 32 is twofold. The loops may be used to receive strap B to secure the device to the side of the golf bag C if it is not convenient to attach the device to the front or upper side of the bag. This arrangement is not shown in the drawings, but it should be easily understood. A second purpose of the loops 32 is to retain either a golf ball marker or a golf ball mark repair tool.

Thus, it will be understood that the novel article carrier of the invention is a compact tray-type device of relatively simple design and construction which is adapted to carry efficiently a plurality of golfer's items and which can be easily attached to and carried on a golf bag disposed in an inclined position in such a manner that the carrier will be disposed in a horizontal or level position on any of three sides of the golf bag, whichever one side is most adaptable to equipment and person using the carrier.

I claim:

1. In an article carrier adapted to be detachably secured to a golf bag, the combination of:
   a. a bottom wall, front and rear end walls, and opposed side walls interconnected to form a tray-like receptacle open at the top;
   b. said rear wall sloping rearwardly and upwardly from said bottom wall at an angle of between 90° and 180°, so that when said carrier is attached to a golf bag which is disposed in an inclined position, said bottom wall will be disposed in a substantially horizontal position;
   c. said rear wall including an upper portion extending a substantial distance above said side walls and including means for detachably securing said carrier to said golf bag;
   d. a sloping transverse wall member extending between said side walls and projecting upwardly and inwardly from said rear end wall in spaced relation with said bottom wall.

2. An article carrier according to claim 1, wherein said securing means includes a strap retaining element extending inwardly from the inner side of said rear end wall for engagement with a portion of a golf bag strap.

3. An article carrier according to claim 1, wherein said transverse wall member includes a lower base portion disposed in a plane generally normal to said rear end wall for cooperation therewith to form a ledge for retaining an article thereon.

4. An article carrier according to claim 1, wherein said transverse wall member includes an upper shelf portion disposed in a plane generally parallel to said bottom wall and including a plurality of apertures therein for receiving a plurality of golf tees.

5. In an article carrier adapted to be detachably secured to a golf bag, the combination of:
   a. a bottom wall, front and rear end walls, and opposed side walls interconnected to form a tray-like receptacle open at the top;
   b. said rear end wall sloping rearwardly and upwardly from said bottom wall at an angle of between 90° and 180°, so that when said carrier is attached to a golf bag which is disposed in an inclined position, said bottom wall will be disposed in a substantially horizontal position;
   c. said rear end wall including an upper portion extending a substantial distance above said side walls and including means for detachably securing said carrier to said golf bag;
   d. a pair of transverse walls being of less height than said side walls and being spaced from each other a distance slightly less than the diameter of a golf ball, so that they can support at least one golf ball on their upper edges between said side walls.

6. In an article carrier adapted to be detachably secured to a golf bag, the combination of:
   a. a bottom wall, front and rear end walls, and opposed side walls interconnected to form a tray-like receptacle open at the top;
   b. said rear end wall sloping rearwardly and upwardly from said bottom wall at an angle of between 90° and 180°, so that when said carrier is attached to a golf bag which is disposed in an inclined position, said bottom wall will be disposed in a substantially horizontal position;
   c. said rear end wall including an upper portion extending a substantial distance above said side walls and indluding means for detachably securing said carrier to said golf bag;
   d. at least one of said side walls having a pair of loops spaced vertically from each other and each extending at an angle of approximately 45° relative to said bottom wall for use in attaching said carrier by a strap to a side of a golf bag.

7. An article carrier according to claim 1, and including a transverse wall extending between said side walls above said end wall.

* * * * *